Sept. 23, 1941. E. F. LAZAR 2,256,787
REMOTE POSITIONAL CONTROL SYSTEM
Filed Jan. 3, 1938 3 Sheets-Sheet 2

INVENTOR
EDWARD F. LAZAR
BY Herbert H. Thompson
HIS ATTORNEY

Sept. 23, 1941.   E. F. LAZAR   2,256,787
REMOTE POSITIONAL CONTROL SYSTEM
Filed Jan. 3, 1938   3 Sheets—Sheet 3
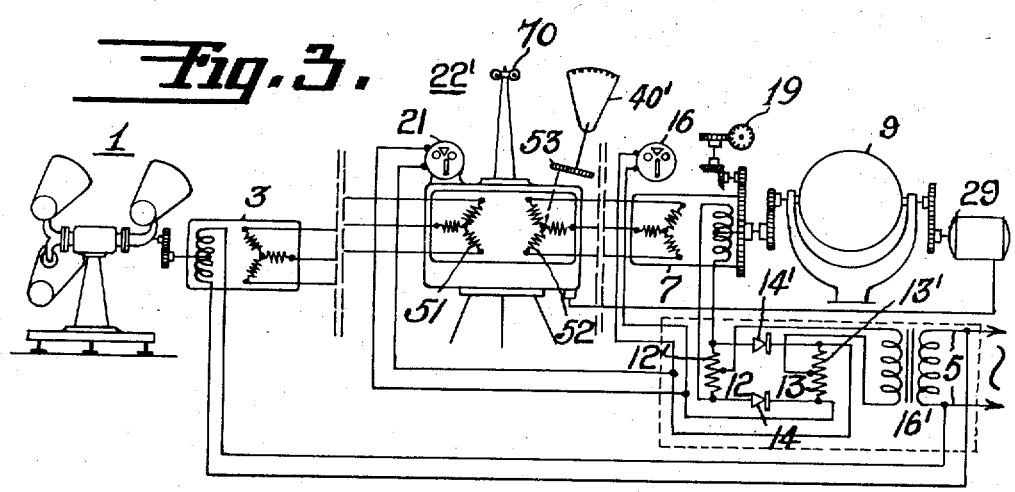
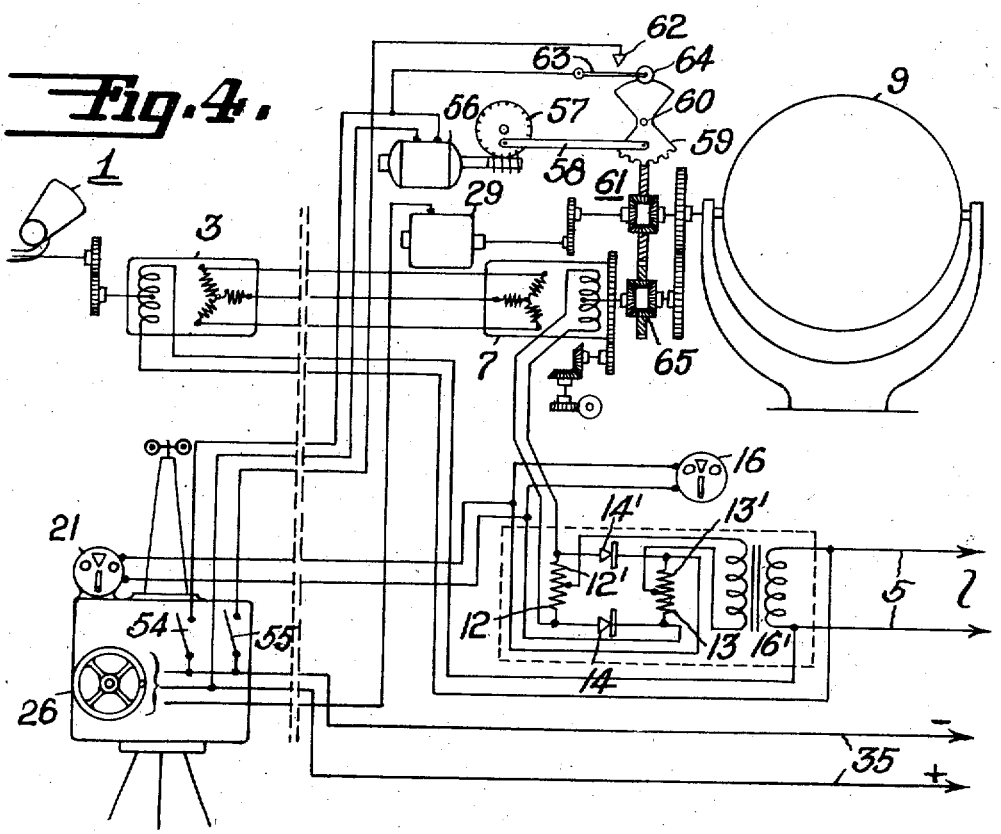
INVENTOR
EDWARD F. LAZAR
BY
Herbert H. Thompson
HIS ATTORNEY Patented Sept. 23, 1941

2,256,787

UNITED STATES PATENT OFFICE 2,256,787

REMOTE POSITIONAL CONTROL SYSTEM

Edward F. Lazar, New York, N. Y., assignor to Sperry Gyroscope Company, Inc., Brooklyn, N. Y., a corporation of New York Application January 3, 1938, Serial No. 183,007

13 Claims. (Cl. 240—1.2)

This invention relates, generally, to positional control systems adapted for the positioning of an object such as a searchlight or gun in synchronism with a controlling object or controller, and the invention has reference, more particularly, to apparatus especially suitable for locating and illuminating aircraft at night so that anti-aircraft gunfire may be directed thereon.

The present practice for locating aircraft is to employ a sound locating device such as a binaural sound locator or other non-optical system of locating the target blind and to transmit therefrom to a searchlight the approximate location of the target, after applying certain corrections, such as that due to sound lag. Such a system is outlined in the prior Patent #1,976,727, dated October 16, 1934, to F. R. House, and is also disclosed in Patent #2,003,661, dated June 4, 1935, to P. R. Bassett et al. When using such systems as disclosed in these patents, a continuous series of datum points or predicted positions is determined from the direction of the incoming sound, with proper corrections applied thereto. It is at this point in the sky that the searchlight beam is directed. However, as there are always certain errors in listening and in the prediction of the target position, it has been found desirable to move the searchlight about the datum position so as to search around the position until the target is found.

The systems of the prior art as exemplified in the above listed patents, are open to certain objections, however, and inaccuracies arise in operation due to the interposition of the control station or comparator between the sound locator and the controlled searchlight. Also, in these systems heretofore used, dials are used which are operated directly from self-synchronous receivers. This practice is objectionable because the load thus imposed upon these receivers may tend to introduce errors. Also, in the systems as heretofore generally constructed, since there was no follow-back connection from the searchlight to the comparator, the searchlight may fall out of synchronism with the sound locator.

The principal object of the present invention is to provide a novel remote positional control system for controlling such objects as searchlights from a sound locator or other control means, in which system the sound locator data is transmitted from the sound locator directly to the searchlight for comparison thereat with the actual position of the searchlight, the results of this comparison being employed for operating right-left or zero reader meters or indicators located at the searchlight and at the remote control station, the said system enabling a very accurate following of the searchlight from the sound locator and eliminating errors of lags present in systems heretofore used.

Another object of the present invention is to employ A. C. synchronous transmitters and receivers of the signal generator type, the variable magnitude, reversible phase output being fed into a simple phase shift detecting circuit, whereby lag or lead of the searchlight or other controlled object is indicated by right or left deflections of an ordinary zero reader D. C. voltmeter, suitable step transmitters being provided at the control station for the purpose of operating the searchlight or other object in accordance with the indications of the zero reader meter, any error or lag of the step transmitters having no effect whatever on the accuracy of the system.

Still another object of the present invention is to provide novel means for causing the searchlight to search in elevation about the data position without causing such searching of the searchlight to be indicated by the control station zero center meter, thereby facilitating the following of the meter indications.

A further object of the present invention is to provide a novel remote positional control system of the above character, wherein means is provided for obtaining searching in azimuth, by normal follow-up of the zero center meter indications.

Still another object of the present invention lies in the provision of a novel remote positional control system of the above character having a single means or knob for controlling both azimuth and elevation search of the searchlight.

Other objects and advantages will become apparent from the specification, taken in connection with the accompanying drawings wherein the invention is embodied in concrete form.

In the drawings,

Fig. 3 is a wiring diagram of a somewhat modified arrangement.

Fig. 4 is a wiring diagram of still another modified arrangement.

Similar characters of reference are used in all of the above figures to indicate corresponding parts.

Figure 1:
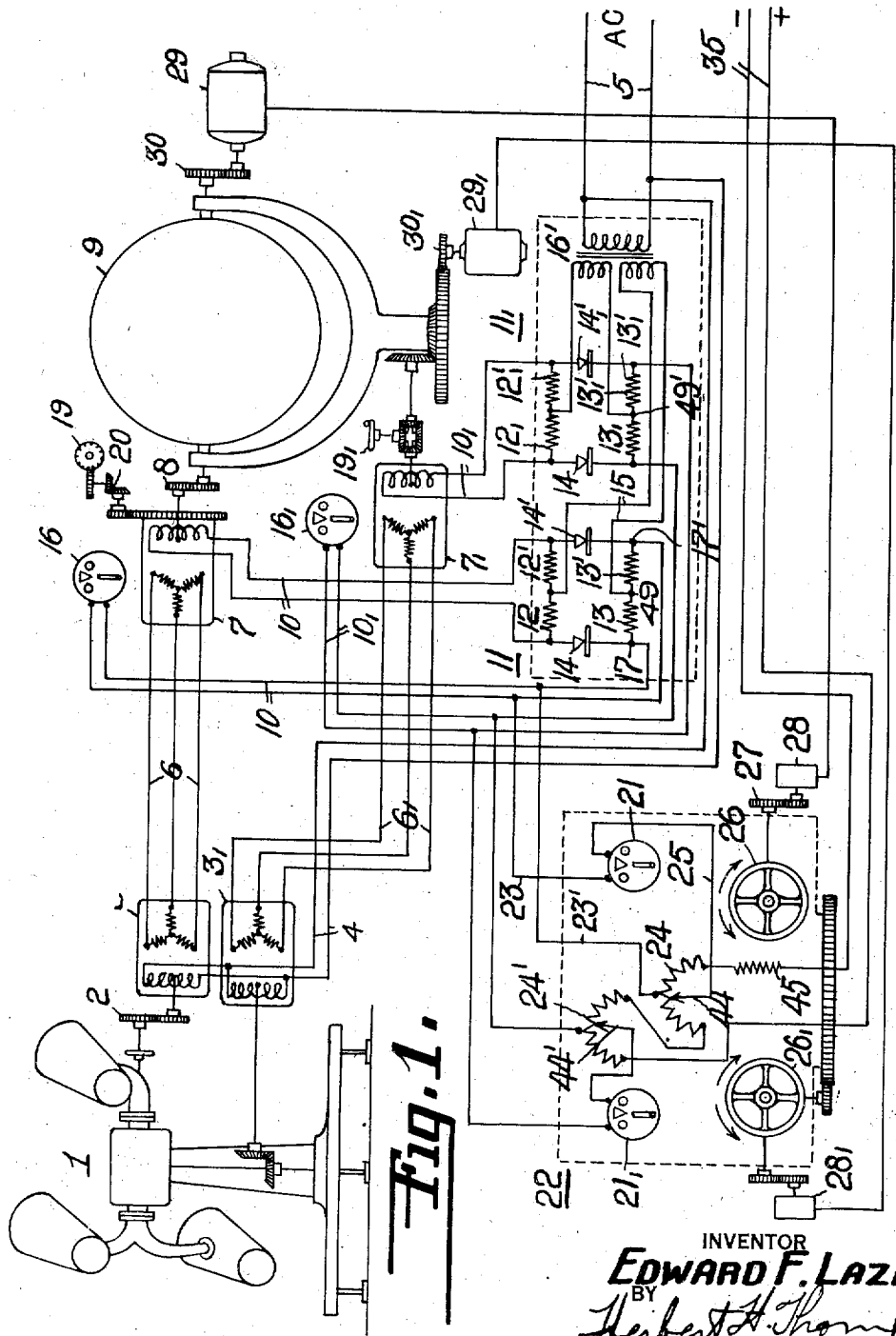
Fig. 1 is a wiring diagram of the preferred form of the novel remote positional control system of this invention.
Figure 2:
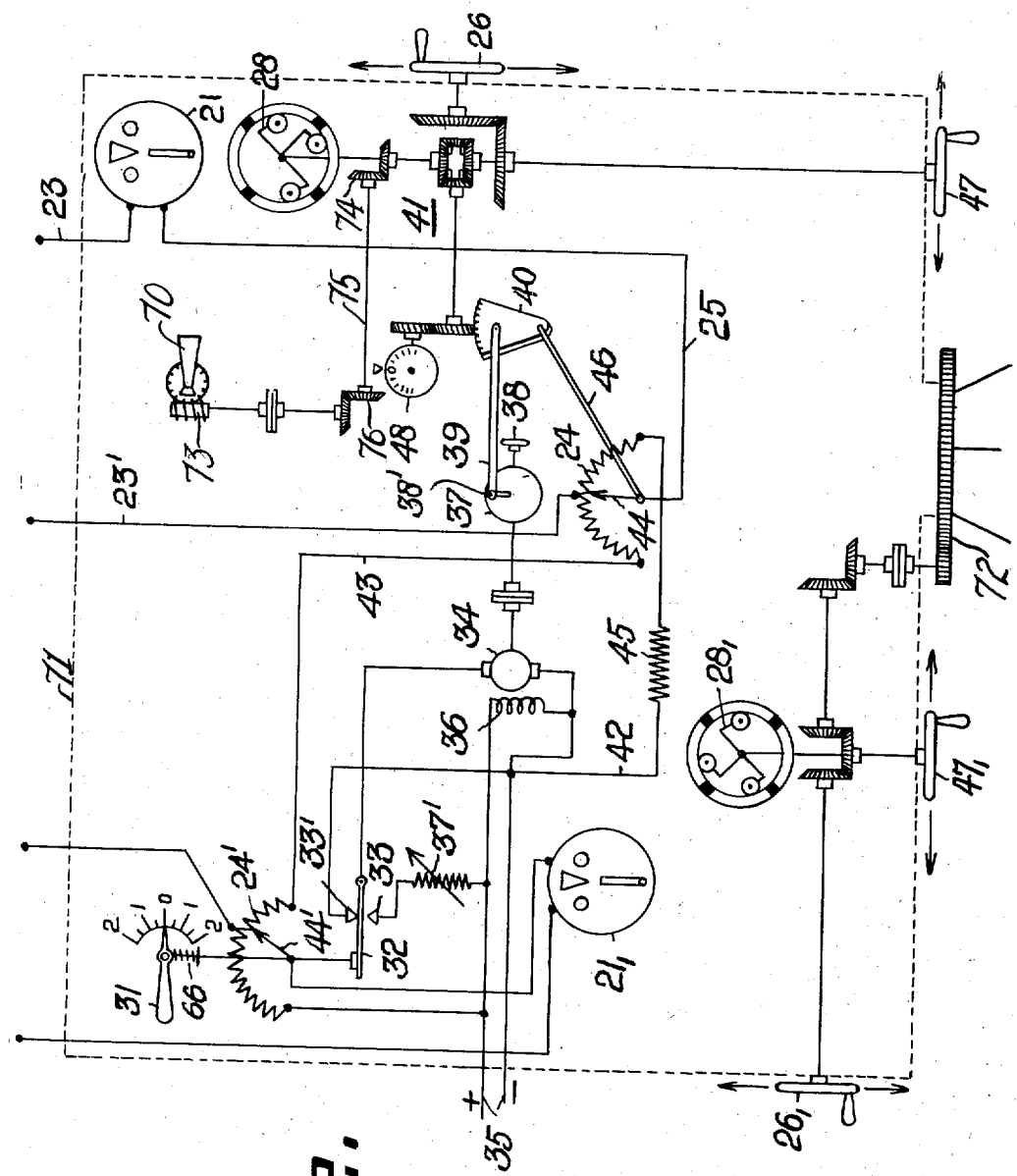
Fig. 2 is an enlarged detailed view, in schematic form, of the control station of Fig. 1.

Referring now to Figs. 1 and 2 of the drawings, the reference numeral 1 designates the sound locator, which may be of the type shown in the copending application of Frank R. House, Serial No. 168,704, filed October 13, 1937, now Patent No. 2,199,404, issued May 7, 1940. The corrected elevation data from sound locator 1 is transmitted through gearing 2 to an A. C. self-synchronous transmitter 3. The single phase winding of this transmitter, supplied from A. C. supply 5 through leads 4, is shown as driven from the gearing 2, while the three phase stator is connected through leads 6 to the three phase stator of a self-synchronous receiver 7 of the signal generator type, having its rotor of single phase connected through gearing 8 to be driven from the searchlight 9 in elevation. As long as the single phase rotor winding of receiver 7 is at right angles to the field of the three phase stator of this receiver, no voltage is induced in the rotor. Should the receiver rotor be shifted slightly either clockwise or counter-clockwise from synchronous position, due to relative movement of the searchlight and sound locator in elevation, a portion of the field flux of the stator cuts the rotor winding and produces a signal voltage therein. Clockwise and counter-clockwise shift of the receiver rotor causes the signal voltage induced in the rotor winding to reverse in phase. The variable magnitude, reversible phase receiver output is fed through single phase leads 10 into a simple phase shift detecting circuit consisting of a pair of resistors 12, 12' connected in series across leads 10, together with a second pair 13, 13' of similar resistors also connected across leads 10.

Rectifiers 14 and 14', preferably of the copper oxide type, are included in leads 10 between the pairs of resistors 12, 12' and 13, 13'. A polarizing voltage is supplied to the inner ends of resistors 12, 12' and 13, 13' by leads 15 connected to one secondary of a transformer 16' supplied from the A. C. source 5. A zero center D. C. voltmeter 16 at the searchlight is connected to leads 10 beyond the resistors 13, 13'.

Assuming that the sound locator and searchlight are in elevational synchronism, the output of the signal generator 7 is zero, so that the rectifiers 14, 14' are caused to rectify the polarizing voltage from transformer 16' equally, and hence the zero center voltmeter 16 will indicate zero, that is, this meter will show zero deflection. Should the searchlight lag the sound locator, the voltage output of the receiver adds in phase with the polarizing voltage across rectifier 14, for example, and opposes the polarizing voltage across rectifier 14'. Rectifier 14 passes more rectifying current than 14', causing point 17 to become positive with respect to point 17', whereby meter 16 is deflected, for example, to the left.

Should the searchlight lead the sound locator, the voltage output of the receiver opposes the polarizing voltage across rectifier 14 and adds with the polarizing voltage across 14', thereby making point 17' positive with respect to 17, so that meter 16 is deflected to the right.

In order to establish the initial synchronization between the sound locator data in elevation and the searchlight, a knob 19 is provided which is connected through gearing 20 to the casing of receiver 7 for the purpose of turning the stator thereof. The sound locator 1 is set at zero elevation, with all corrections removed, and the searchlight 9 is also set at zero elevation, and the A. C. circuit 5 is energized. The knob 19, which is preferably located adjacent to the meter 16, is now turned until the pointer of meter 16 is centered. The correlation between deflections of the meter 16 and the direction of rotation of knob 19 is such that if the pointer of meter 16 deflects to the right, the knob is turned counter-clockwise, and if the deflection is to the left, the knob is turned clockwise to center the pointer of the meter 16 so as to avoid 180° ambiguity. With orientation thusly obtained, the knob 19 is locked in position. Thereafter, non-synchronism between the searchlight and elevation data is indicated by right or left deflection of the pointer of meter 16 and also of a similar meter 21 located at the control station 22.

The control station 22 may be located at any desired point, taking the searchlight 9 as a center. Thus, for example, the searchlight may be located at, for example, 900 feet from the sound locator, and the control station 22 may be located, for example, at 700 feet from the searchlight 9 at any angle. These figures are given by way of example, however, and it is to be understood that they may be increased to several thousand feet without any adverse effect upon the accuracy of the system due to its inherent sensitivity and accuracy.

One of the leads 10 is connected directly by a lead 23 to the right-left meter 21, at the control station, whereas the other lead 10 is connected through a lead 23' extending to the mid-tap of a potentiometer 24, the slider 44 of which is connected by a lead 25 to the meter 21. It will be apparent that with the slider of potentiometer 24 at its central position, the meter 21 will be directly connected across the output of the elevation phase detector 11, as is true of meter 16. Hence, non-synchronism between the searchlight and elevation data is indicated by left or right deflection of meter 21. The elevation follow-up handwheel 26 at the control station is connected through gearing 27 to drive the step-by-step transmitter 28 which synchronously controls the elevation step-by-step motor 29 which is connected through gearing 30 for driving the searchlight about its elevation axis.

The correlation between the deflections of meter 21 and the rotation of handwheel 26 is similar to that existing between meter 16 and knob 19 at the searchlight. Hence, in order to maintain synchronism between the searchlight and the moving elevation data, it is only necessary to turn elevation follow-up handwheel 26 so as to steer or move the pointer of meter 21 to zero. This action takes place continuously while following the sound locator data, and should it be necessary to search for the target, the observer at the control station is provided with a knob or handle 31 (see Fig. 2) which, when depressed, serves to close a switch blade 32 upon a stationary contact 33, thereby completing a circuit for a search motor 34 from D. C. supply leads 35. The field 36 of motor 34 is permanently connected across leads 35 and a variable resistor 37' is connected in the armature circuit of motor 34 for varying the speed thereof at will. Motor 34 drives a crank disc 37 whose effective radius is adjustable by moving crank pin 38'. This crank disc operates through link 39 to oscillate a sector plate 40 which, in turn, acts through suitable gearing for turning one arm of a differential 41 having another arm thereof driven from the elevation control handwheel 26. Thus, by depressing handle 31, motor 34 is caused to operate to effect an oscillation of sector plate 40 which, in turn, acts to superimpose upon the movements imparted to the elevation step-bystep transmitter 28 from handwheel 26 an oscillatory motion which causes the searchlight 9 to oscillate in elevation at a speed and amplitude determined by the adjustment of the crank pin 38' and that of resistor 37' in the circuit of motor 34. The elevation potentiometer 24 has one side thereof connected through leads 42, including a resistor 45 to one side of the D. C. supply 35, whereas the other side of potentiometer 24 is connected through a lead 43 including azimuth potentiometer 24' to the other side of supply 35. Hence, displacement of the slider 44 of potentiometer 24 from its central position causes a D. C. voltage to be inserted in series with the output of the elevation phase detector 11, thus affecting the reading of meter 21. The slider 44 is shifted by a rod 46 so as to turn with the sector plate 40. The polarity of the D. C. supply for potentiometer 24 and the angular movement of the slider are so arranged that the voltage inserted in series with meter 21 is equal and opposite at every point to the output of the phase shift detector 11 due to the excursion or searching of the searchlight, from data caused by the superimposed oscillatory movement, whereby such oscillatory movement of the searchlight causes no movement of the pointer of meter 21. During searching, therefore, the handwheel 26 is operated in the normal manner to keep meter 21 centered, thereby facilitating following the elevation data, and thus the oscillating search is symmetrical about the data. When the target appears in the searchlight beam the observer releases knob or handle 31 and the search stops immediately due to the dynamic braking of motor 34, the upward movement of switch knob 31 under action of spring 66 serving to cause switch plate 32 to engage stationary contact 33', thereby shorting the armature of motor 34. The observer at the control station then keeps the target in the beam by use of the observer's handwheel 47, the follow-up operator relinquishing the elevation control follow-up handwheel 26.

When tracking ceases, the observer rotates knob 38 on the shaft of motor 34 until the oscillation indicator 48 operated from sector 40 indicates that the slider 44 is in its central position, thereby eliminating any offset remaining from the previous operation.

The equipment used for providing for azimuth operation of the searchlight is similar to that used for elevation operation thereof, and parts of the azimuth operation equipment that are similar to parts of the elevation equipment are similarly numbered, though provided with the subscript 1.

Orientation or initial synchronization in azimuth is accomplished by pointing the sound locator together with the searchlight in azimuth at a common distant object, such as the sun or a star, and then adjusting by means of knob 19₁ the pointer of meter 16₁ to its zero center position, and then locking knob 19₁. While the azimuth data is being followed in the usual way, the slider 44' is in its central position on potentiometer 24', and meter 21₁ is directly across the output of phase detector 11₁. Should the observer desire to sweep the searchlight beam to the right or left of the azimuth data, it is merely necessary for him to slowly turn the knob or handle 31, correspondingly shifting the slider 44' from its central position, thereby inserting in series with meter 21₁ a voltage of proper polarity to shift the pointer of this meter, which when centered by operation of the follow-up handwheel 26₁, causes the desired searchlight azimuth shift from the data. So long as knob 31 is oscillated or turned at a rate not exceeding the capability of the follow-up operator to center the zero reader, the searchlight oscillates in azimuth about the data in synchronism with the rotary movement of knob 31.

In practical field use, it sometimes happens, owing to meteorological or other conditions, that the sound locator data consistently lags or leads the target in azimuth. In such case, the azimuth offset knob 31 provides a convenient means of inserting a compensating correction so that the chances of pick-up without azimuth search are enhanced. Should, for any reason, the control station 22 become inoperative, the searchlight 9 may be disconnected from the step motors 29 and 29₁ and thereafter the same manually operated to follow the data by use of the zero readers 16 and 16₁ located at the searchlight.

The accuracy obtainable when using the system of this invention is considerably greater than that obtainable with the ordinary systems heretofore used. The electrical field shift of the receiver signal generator is utilized directly for operating the meters 16, 16₁, 21 and 21₁ to thereby show any displacement of the telescope 70 from data. This telescope is mounted on top of the control station 22 and is usually constructed as a binocular. It rotates in azimuth with the housing 71, which is controlled from the handwheel 26' or 47' by means of a gear train. A worm and worm gear 73 moves the telescope in elevation and is controlled from handwheels 26 or 47 by means of bevel gears 74, shaft 75 and bevel gears 76. The errors in the ordinary data systems heretofore used arise from the fact that the electrical field shift in the receivers is required to do mechanical work in overcoming friction in positioning the rotors to which the indicating dials are attached. The zero reader system of this invention also eliminates errors involved in pointer matching at the control station. In an emergency it is also possible and convenient when using the present system to have the personnel at the searchlight follow the sound locator by manual control by using the zero readers, i. e. meters 16 and 16₁ at the searchlight.

An important feature of the invention lies in the fact that since the receiver has to do no work, such as turning its rotor and dial, the current in the leads 6, 6₁ and 4 is very small, permitting the use of small cables. Likewise, the separation between sound locator and searchlight may be increased to several thousand feet without adverse effect upon the accuracy.

Furthermore, while the zero reader type of control apparatus, as involved in this invention, retains all the advantages of the comparator controller repeat back system, nevertheless the same offers additional improvements in accuracy and in greater simplicity in apparatus, and far greater flexibility in location of the sound locator, searchlight and control station. Preferably, the zero reader meters 16, 16₁, 21 and 21₁ are non-linear with misalignment of the sound locator and searchlight, the deflection being large for small lag or lead for enabling close following, the deflection increasing more slowly for larger misalignments.

If desired, the phase detectors 11 and 11₁ may be located at the control station 22 instead of at the searchlight 9. In this case, the potentiometers 24 and 24' at the control station may be eliminated and in lieu thereof potentiometers may be substituted for the equal resistors 13, 13' of phase detector 11 and 13₁ and 13'₁ of phase detector 11₁. In this case the taps 49 of phase detector 11 and 49' of phase detector 11₁ are adjustable as sliders over the potentiometer. With the sliders in the positions corresponding to the showing of Fig. 1, the phase detector bridge circuits are symmetrical and deflections of the zero readers 16, 21 and 16₁, 21₁ are correct indications of the searchlight position relative to the data. Should either slider be displaced, however, from this position, the corresponding bridge circuit is rendered unsymmetrical and furnishes an output voltage to the zero readers for zero input from receiver 7 or 7₁, as the case may be, and the polarity of this voltage reverses as the slider is moved to the left or right of this mid position. The slider of the elevation potentiometer electrically connected between leads 10 would be mechanically connected for oscillation by the oscillating sector plate 40, and the slider of the azimuth potentiometer would be connected for rotation by knob 31, thereby producing compensation for elevation search and providing for azimuth search or offset.

In Fig. 3, a somewhat modified form of the invention is illustrated. In this figure, for the sake of simplicity, only the apparatus for obtaining elevation control of the searchlight 9 is shown, the azimuth apparatus being similar to that illustrated in Fig. 2. Parts of this figure which are similar to corresponding parts of Figs. 1 and 2 are similarly numbered.

In this form of the invention, the sound locator data supplied from transmitter 3 is passed through differential data units consisting of inductively related three phase windings 51 and 52 in the remote control station 22'. One of these windings is usually a stator winding 51 in a housing providing bearings for a rotor which carries the other winding 52. Such devices are commonly known in the art as "electrical differentials". As used in Fig. 3, the differential serves to add to the positional signal in winding 51 another positional signal created by the mechanical rotation of rotor windings 52, delivering to winding 7 a positional signal equal to the sum of the two first named signals. The receiver 7 is located at the searchlight. The elevation differential unit rotor 52 is connected through gearing 53 to a sector plate 40' similar to sector plate 40 of Fig. 2 of the drawings. As in Fig. 2, sector plate 40' is oscillated by crank disk 37 driven from motor 34, and, in turn, plate 40' acts through suitable gearing to turn one arm of the differential 41 having another arm thereof driven from the elevation control handwheel 26, thereby superimposing upon the movements imparted to the elevation step-by-step transmitter 28 from handwheel 26 an oscillatory motion which causes searchlight 9 to oscillate in elevation. Sector plate 40' serves to oscillate the unit 52 and thereby subtract from and add to the data, potentials corresponding and opposite to those put out by the phase shift detector due to the excursion or searching of the searchlight, whereby such searching causes no movement of the pointers of meters 16 and 21. Similarly, the azimuth differential unit, not shown in Fig. 3, is geared to the knob 31 of Fig. 2 to add to the data the azimuth search desired. Further description of this figure would appear to be unnecessary.

In the form of the invention shown in Fig. 4, parts that are similar to parts of the preceding figures are similarly numbered. In this form of the invention, the oscillation or search of the searchlight is accomplished through use of an auxiliary motor 56 that operates through worm and wheel gearing 57 and link 58 and sector 59, pivoted at 60, to turn one arm of a differential gear 61 having its other arm driven from the distant electrical control motor 29, i. e., the step-by-step repeater, the third arm of the differential 61 being connected to the searchlight 9 for driving the latter. Thus, operation of motor 56 imposes an oscillatory movement upon the movements of the searchlight 9 due to the operation of the repeater motor 29. A switch 54 at the control station may be used for controlling the auxiliary motor 56.

In order to remove any oscillation offset remaining after an operation, the switch 55 at the control station is provided, which, when closed, causes the motor to run until a stationary contact 62 is disengaged by a movable blade contact 63, carrying a roller 64 movable over the sector plate 59. At the position of zero search amplitude, the roller 64 enters a notch in the sector plate 59, thereby opening the circuit of motor 56. Differential gearing 65 is shown in Fig. 4 operated from the searchlight 9 and connected to the single phase rotor of the receiver 7 for the purpose of removing or erasing the oscillatory movements from the receiver so that the search does not affect the zero reader indication of meters 16 and 21, thereby facilitating the operation of the elevation follow-up handwheel 26 at the control station. The center arm of this differential is meshed with the center arm of differential 61, thereby causing oscillation of the rotor of receiver 7. At the same time, an equal and opposite oscillation is introduced through the third arm, geared to the searchlight, so that both oscillations cancel out.

Only the elevation control apparatus is shown in this figure, as in Fig. 3, the azimuth control apparatus being similar to the elevation control, and hence would appear not to require illustration. The azimuth oscillation motor, not shown, is preferably controlled by a reversing switch at the control station, so that the searchlight may be swung slowly to the right or left of the data desired. An azimuth centering device similar to that employed in the elevation apparatus may be used.

It will be apparent that instead of using a sound locator in connection with the system of this invention, other non-optical locating means, such as infra-red detectors, or radio wave detectors, may be used, if desired, all within the scope of the appended claims.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

What is claimed is:

1. In a remote positional control system, a sound locator, a remote searchlight arranged to be controlled in accordance with data transmitted from said sound locator, transmission means for conveying the data directly from said sound locator to said searchlight for comparison thereat with the actual position of said searchlight, a control station located at any desired position about said searchlight and remote therefrom, means for converting the results of said compared data into a reversible direct current voltage, a right-left meter at said control station fed from said voltage, and a distant electrical control system connecting said control station and said searchlight for operating the latter in accordance with said meter indications.

2. In a remote positional control system, a sound locator, a remote searchlight arranged to be controlled in accordance with data transmitted from said sound locator, transmission means for conveying the data directly from said sound locator to said searchlight for comparison thereat with the actual position of said searchlight, a control station located at any desired position about said searchlight and remote therefrom, means for converting the results of said compared data into a reversible direct current voltage, a right-left meter at said control station fed from said voltage, a distant electrical control system connecting said control station and said searchlight for operating the latter in accordance with said meter indications, said control system having a rotatable transmitter at said control station and a power repeater at said searchlight, and means for superimposing an oscillatory movement on the rotation of said transmitter to effect searching of said searchlight about its datum position.

3. In a remote positional control system, a sound locator, a remote searchlight arranged to be controlled in accordance with data transmitted from said sound locator, transmission means for conveying the data directly from said sound locator to said searchlight for comparison thereat with the actual position of said searchlight, a control station located at any desired position about said searchlight and remote therefrom, means for converting the results of said compared data into reversible direct current potentials, a right-left meter at said last named control station fed from said means, a distant electrical control system connecting said control station and said searchlight for operating the latter in accordance with said meter indications, said control system having a rotatable transmitter at said control station and a receiver at said searchlight, means for adding an extraneous oscillatory movement to the rotation of said transmitter to effect searching of said searchlight about its datum position, and means operated from said last named means and connected to said right-left meter for preventing said meter from indicating said oscillations.

4. In a remote positional control system, a target position locator, a controlled object, a self-synchronous transmission system having a transmitter and receiver electrically connected for interconnecting said locator and controlled object, a remote control station, a phase shift detecting circuit fed from the receiver of said system, a step by step transmission system having a transmitter and a receiver electrically connected for interconnection between said control station and said controlled object for moving the latter, a right-left meter at said control station fed from said phase shift detecting circuit for use in operating said step by step transmission system, and means for automatically adding a search oscillation to the rotation of said step by step transmitter to effect searching of said controlled object, and means operated by said oscillating means to synchronously change the constants of said phase shift detecting circuit, whereby the effect of the searching of said controlled object is eliminated from the indications of said meter.

5. In a remote positional control system, a target position locator, a controlled object, a self-synchronous transmitter at said locator, a self-synchronous repeater at said controlled object and electrically connected to said transmitter, a remote control station, a phase shift detecting circuit fed from said receiver, a step by step transmitter at said control station and electrically connected to a step by step receiver at said controlled object for moving the latter, a zero center meter at said control station fed from said phase shift detecting network for use in operating said step by step transmitter, and manually controlled means for superimposing external potentials of changing polarity to said meter, whereby manual operation of said step by step transmitter to maintain said meter centered automatically produces search movement of said controlled object.

6. In a remote positional control system, a target position locator, a controlled object, a self-synchronous transmission system interconnecting said locator and controlled object, a remote control station, a phase shift detecting circuit fed from the receiver of said system, a step by step transmission system extending between said control station and said controlled object for moving the latter, a right-left meter at said control station fed from said phase shift detecting circuit for use in operating said step by step transmitter, and means for superimposing a search oscillation on said step by step transmitter to effect searching of said controlled object, said means also serving to synchronously apply external potentials of changing polarity and value to said meter, whereby the potentials produced by the searching motion of said controlled object are counterbalanced in their effect on said meter.

7. In a remote positional control system, a target position locator, a controlled object, a self-synchronous transmission system interconnecting said locator and controlled object, a control station, a two-part electrical differential at said station and included in said system, a step by step transmission system extending between said control station and said controlled object for moving the latter, a phase shift detecting network fed from the receiver of said self-synchronous transmission system, a right-left meter at said control station fed from said network for use in operating said step by step transmitter, and means for turning one part of said electrical differential to offset oscillation of said part caused by said controlled object when searching about its synchronous position, whereby such searching is not indicated on said meter.

8. In a remote positional control system, a target position locator, a controlled object, a self-synchronous transmission system interconnecting said locator and controlled object, a control station, phase shift detecting means in the output circuit of the receiver of said system, a right-left meter at said control station operated from said means, a step by step transmission system extending between said control station and said controlled object for moving the latter in accordance with said meter indications, an auxiliary motor for superimposing an oscillation upon the motion of said controlled object, and differential gearing connected to said auxiliary motor and said self-synchronous receiver for erasing said oscillation therefrom, whereby the meter indication is rendered independent of said oscillation.

9. In a remote control system for positioning a controlled object in accordance with positional data transmitted from a reference object, a controlled object, a reference object, a self-synchronous transmitter supplying an electrical signal in accordance with the position of said reference object, a self-synchronous receiver comprising a stator and a rotor receiving said signal, said rotor being mechanically connected to said controlled object for generating an alternating voltage variable in magnitude in accordance with the disagreement of the position of said controlled object and the positional data supplied by said signal and reversing in phase as said controlled object passes through the position corresponding to said data, a phase sensitive circuit receiving the voltage of said rotor and supplying a D. C. voltage having a magnitude and polarity corresponding to the magnitude and phase of said rotor voltage, a zero center meter located at a control station remote from said controlled object and connected to said circuit for indicating the magnitude and sense of the deviation of said controlled object from said position of correspondence, remote control means including a step-by-step transmission system for positioning said controlled object and a manual controller for said transmission system adjacent said meter whereby an operator is enabled simultaneously to view the indication of said meter and to position said controlled object in accordance with the indications thereof.

10. In a remote positional control system, locator means, a searchlight, a self-synchronous transmission system interconnecting said locator means and searchlight, a control station, a two-part electrical differential at said station and included in said system, a step by step transmitter system extending between said control station and said searchlight for moving the latter, means for automatically adding an oscillatory movement to the movement of said step by step transmitter for producing searching of said searchlight and for oscillating one part of said differential to compensate for the effect of such searching of said searchlight on said self-synchronous transmission system.

11. In a three-station sound locator-searchlight system, the combination with a sound locator, searchlight and remotely located control station having a sight thereat, A. C. self-synchronous transmitters at said sound locator and actuated by rotation in azimuth and elevation thereof, signal generators at said searchlight activated by said transmitters upon disagreement in angular position of said sound locator and searchlight in azimuth and elevation, respectively, a pair of zero-reader indicators at said control station controlled respectively from said signal generators, and manually operable azimuth and elevation transmitters at said control station for synchronously operating said searchlight in azimuth and elevation either in accordance with said indicators or said sight at will.

12. In a searchlight-sound locator system, the combination with a searchlight and a remote sound locator, means for generating a primary electrical signal proportional to the positional disagreement of said searchlight and sound locator, an indicator operated by said signal whereby said searchlight and locator are maintained directed at the same target, additional means for giving said searchlight periodic limited searching movement, a second generating means for generating a secondary signal proportional to said searching movement, and means for superimposing said secondary signal on said primary signal, whereby said indicator is rendered insensitive to the aforesaid searching movements of said searchlight.

13. In a three-station sound locator-searchlight-remote control station system capable of operation without reference to the control station, the combination of a sound locator, a searchlight, A. C. self-synchronous transmitters, at said sound locator, actuated by rotation in azimuth and elevation thereof, signal generators, at said searchlight, actuated by said transmitters upon disagreement in angular position of said sound locator and searchlight in azimuth and elevation, respectively, a pair of zero-reader indicators, at said searchlight, controlled respectively from said signal generators, and manually controlled means, at said searchlight, by which the searchlight is rotatable in azimuth and elevation in accordance with the reading on said indicators.

EDWARD F. LAZAR.